United States Patent [19]

Eck et al.

[11] Patent Number: 6,090,868
[45] Date of Patent: Jul. 18, 2000

[54] PROCESS FOR TREATING MINERAL COATING AGENT AND BINDER COMPOSITIONS WITH PLASTICS

[75] Inventors: Herbert Eck, Bad Toelz; Peter Ball, Emmerting; Reiner Figge, Ampfing, all of Germany

[73] Assignee: Wacker-Chemie GmbH, Munich, Germany

[21] Appl. No.: 09/068,533

[22] PCT Filed: Nov. 14, 1996

[86] PCT No.: PCT/EP96/04999

§ 371 Date: May 13, 1998

§ 102(e) Date: May 13, 1998

[87] PCT Pub. No.: WO97/18175

PCT Pub. Date: May 22, 1997

[30] Foreign Application Priority Data

Nov. 14, 1995 [DE] Germany .................. 195 42 443

[51] Int. Cl.[7] .............. C08L 29/04; C08K 5/54; C04B 24/42
[52] U.S. Cl. .............. 523/212; 523/205; 524/5; 524/261; 524/430; 524/503; 524/524; 106/287.16
[58] Field of Search .............. 524/5, 261, 430, 524/503; 523/524, 212, 205; 106/287.16

[56] References Cited

U.S. PATENT DOCUMENTS

| | | |
|---|---|---|
| 4,174,228 | 11/1979 | Boberski et al. .................. 106/287.16 |
| 4,859,751 | 8/1989 | Schulze et al. . |
| 4,935,062 | 6/1990 | Brown et al. .................. 106/287.16 |

FOREIGN PATENT DOCUMENTS

| | | |
|---|---|---|
| 0149098 | 7/1985 | European Pat. Off. . |
| 0228657 | 7/1987 | European Pat. Off. . |
| 0279373 | 8/1988 | European Pat. Off. . |
| 0407889 | 1/1991 | European Pat. Off. . |
| 0508155 | 10/1992 | European Pat. Off. . |
| 0493168 | 6/1995 | European Pat. Off. . |
| 4317036 | 11/1994 | Germany . |
| 4402409 | 8/1995 | Germany . |

OTHER PUBLICATIONS

Derwent Abstract corresponding to DE–4317036 (Nov. 1994).
Derwent Abstract corresponding to DE–4402409 (Aug. 1995).
Derwent Abstract corresponding to EP–0407889 (Jan. 1991).
Derwent Abstract corresponding to EP–0493168 (6, 1995).
Derwent Abstract corresponding to EP–0279373 (Aug. 1988).

*Primary Examiner*—Andrew E. C. Merriam
*Attorney, Agent, or Firm*—Burgess, Ryan & Wayne

[57] ABSTRACT

A process is provided for treating mineral hydraulically or non-hydraulically setting coating agent and binder compositions using water-redispersible powders wherein one or more organopolymer powders and one or more organosilicon powders are added to the dry coating agent and binder composition.

6 Claims, No Drawings

6,090,868

PROCESS FOR TREATING MINERAL COATING AGENT AND BINDER COMPOSITIONS WITH PLASTICS

BACKGROUND OF THE INVENTION

1) Field of the Invention

The invention relates to a process for the polymer modification of mineral coating agent and binder compositions by means of powders which are redispersible in water.

2) Background Art

The modification of powder paints, hydraulically setting systems, such as cementitious systems, gypsum-containing compositions and other pulverulent building materials by polymers which are redispersible in water is described in the prior art. The polymeric substances added usually act as binders. They often increase the elasticity and reduce the brittleness of the materials.

EP-A 149098 (U.S. Pat. No. 4,859,751) discloses, for example, redispersible powders based on vinyl chloride/ethylene copolymers as additives in hydraulic compositions, paints and coating compositions, adhesives and plastic plasters, to improve their mechanical properties. EP-A 407889 describes the use of redispersible polymer powders as additives for hydraulic binders to improve the mechanical strength. DE-A 4317036 describes polymer powders based on methyl methacrylate as additives in mineral binding building materials.

It is furthermore known from the prior art to employ organosilicon compounds, such as polysiloxanes or organosilanes, in powder form for hydrophobizing powder paints, hydraulically setting building materials or other pulverulent building materials. EP-A 228657 describes redispersible organosilicon compounds as hydrophobizing additives to plasters, hydraulic binders or paints. EP-A 508155 describes polysiloxane powders as hydrophobizing agents. EP-A 279373 discloses redispersible organopolysiloxane powders as additives in building materials.

Although these products are suitable as hydrophobizing agents, inter alia, for hydraulically setting compositions, their binder character is in general less pronounced than that of organic polymers. In addition, the use of organosilicon compounds as binders for application in building materials comprising mineral coating agent and binder compositions is often prohibited in practice for economic reasons and/or owing to considerations of performance, since if excessive amounts are added the processing properties are adversely affected.

In certain uses for mineral coating agent and binder compositions, a hydrophobizing effect is now also required, in addition to improved mechanical properties. It is known from the prior art to employ for this purpose dispersible powders which are obtained by spray drying an aqueous mixture of vinyl polymer or acrylic polymer and silicone (EP-A 493168) or are obtained by spray drying an aqueous mixture of organic polymer and organosilicon compound (DE-A 4402409).

Depending on the amount and types of organosilicon compounds(s) added to the aqueous mixture to be dried, binders which are hydrophobizing to a greater or lesser degree can thus be prepared. It is a significant disadvantage here that the requirements placed on such additives differ greatly, and for this reason a specific redispersible powder with a specific organic polymer/organosilicone mixing ratio must be prepared for each requirement, which results in a large number of different types of product. Co-spraying organic polymer dispersions with organosilicone emulsions which are incompatible with them, for example because of incompatible emulsifier/protective colloid systems, is also problematic.

The object was therefore to provide a process for modifying mineral coating agent and binder compositions with organic polymers and organosilicon compounds which ensures a higher flexibility in respect of the ratios of amounts of organic polymer and organosilicon content, compared with the prior art, and avoids the abovementioned incompatibilities.

SUMMARY OF THE INVENTION

The invention relates to a process for the polymer modification of mineral coating agent and binder compositions, which are hydraulically setting or are not hydraulically setting, by means of powders which are redispersible in water, characterized in that one or more organic polymer powders which are redispersible in water and one or more organosilicon powders which are redispersible in water are added to the dry coating or binder composition.

DESCRIPTION OF THE PREFERRED EMBODIMENTS

The mineral, hydraulically setting coating agent and binder compositions are those based on hydraulic binders, such as cement and gypsum. These compositions usually also comprise additives: for example pigments, such as titanium oxide, fillers, such as talc, quartz (sand), calcium carbonate, aluminum silicates or fiber materials, thickeners, such as cellulose, dispersants, fungicides, preservatives, defoamers, wetting agents or film formation auxiliaries. Such binder and coating compositions are used as cement mortars, plasters, building adhesives (for example tile adhesives), filling and stopping compositions or plaster of Paris. The corresponding recipes are known to the expert.

The mineral coating agent and binder compositions which are not hydraulically setting are compositions which comprise mineral fillers, such as titanium oxide, calcium carbonate, kaolins or barium sulfate, and which usually comprise synthetic resins as binders. In the procedure according to the invention, the synthetic resin content can be introduced as a whole by means of the redispersible organic polymer; alternatively, the redispersible organic polymer can be introduced in addition to the synthetic resin content. These compositions usually also comprise additives: for example pigments, thickeners, such as cellulose, dispersants, fungicides, preserving auxiliaries, defoamers, wetting agents or film formation auxiliaries. Such binder and coating compositions are employed as paints, primers, cement-free stopping compositions, coating agents for paper and textiles and as adhesives for wood, paper and plastic. The corresponding recipes are known to the expert.

The amount of organic polymer powder and organosilicon powder added depends greatly on the particular use for which the coating agent or binder composition is intended. The content of organic polymer powder is usually considerably higher than the content of organosilicon powder. 0.1 to 20% by weight of one or more redispersible organic polymer powders and 0.001 to 5.0% by weight of one or more organosilicon powders which are redispersible in water are usually added to the dry coating agent or binder composition, in each case based on the dry weight of the coating agent or binder compositions.

In the procedure according to the invention, the organic polymer powder and the organosilicon powder are mixed with the dry formulation constituents of the coating agent and binder compositions. The addition to the formulation constituents can be carried out here separately or as a ready-made mixture of organic polymer and organosilicon powder in the usual equipment for dry mixing. The coating and binder compositions are then rendered ready to process, if appropriate after addition of water and other, possibly liquid, additives.

The organic polymer powders which are redispersible in water are prepared by drying a dispersion of a water-insoluble polymer in a solution, which is in general aqueous, of a film-forming, water-soluble polymer, if appropriate in the presence of further additives, such as, for example, emulsifiers, antiblocking agents, biocides, plasticizers, film formation auxiliaries, foam stabilizers or defoamers. The dispersions to be dried in general have a solids content of 20 to 60%. Drying is preferably carried out by spray drying in a hot stream of air and/or stream of inert gas. It can also be carried out by freeze drying and, if the polymers are water-insoluble polymers which do not form a film under the drying conditions applied, also by thin film drying, for example belt drying or roller drying.

Preferred water-insoluble polymers are: Vinyl ester homo- or copolymers comprising one or more monomer units from the group consisting of vinyl esters of unbranched or branched alkylcarboxylic acids having 1 to 15 C atoms;

(Meth)acrylic acid ester homo- or copolymers comprising one or more monomer units from the group consisting of methacrylic, acid esters and acrylic acid esters of unbranched or branched alcohols having 1 to 12 C atoms; Homo- or copolymers of fumaric and/or maleic acid mono- or diesters of unbranched or branched alcohols having 1 to 12 C atoms;

Homo- or copolymers of dienes, such as butadiene or isoprene, and of olefins, such as ethene or propene, it being possible for the dienen to be copolymerized, for is example with styrene, (meth)acrylic acid esters or the esters of fumaric or maleic acid;

Homo- or copolymers of vinyl aromatics, such as styrene, methylstyrene or vinyltoluene; and Homo- or copolymers of vinyl-halogen compounds, such as vinyl chloride.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having up to 10 C atoms, for example those having 9 to 10 C atoms (sold by the Shell Corporation under trademarks (VeoVa 9® or VEDVA®), and vinyl methylnorbornanemonocarboxylate. Vinyl acetate is particularly preferred.

Preferred methacrylic acid esters or acrylic acid esters are methyl acrylate, methyl methacrylate, ethyl acrylate, ethyl methacrylate, propyl acrylate, propyl methacrylate, n-butyl acrylate, t-butyl acrylate, n-butyl methacrylate, t-butyl methacrylate and 2-ethylhexyl acrylate. Methyl acrylate, methyl methacrylate, n-butyl acrylate and 2-ethylhexyl acrylate are particularly preferred. Preferred ester groups of fumaric, and maleic acid are the methyl, ethyl, n-propyl, iso-propyl, n-butyl, iso-butyl, t-butyl, hexyl, ethylhexyl and dodecyl group.

If appropriate, the vinyl ester copolymers can comprise 1.0 to 65% by weight, based on the total weight of the comonomer phase, of α-olefins, such as ethylene or propylene, and/or vinyl aromatics, such as styrene, and/or vinyl halides, such as vinyl chloride, and/or acrylic acid esters or methacrylic acid esters of alcohols having 1 to 10 C atoms, such as methyl acrylate, methyl methacrylate, ethyl acrylate, ethyl methacrylate, propyl acrylate, propyl methacrylate, n-butyl acrylate, t-butyl acrylate, n-butyl methacrylate, t-butyl methacrylate and 2-ethylhexyl acrylate, and/or ethylenically unsaturated dicarboxylic acid esters or derivatives thereof, such as diisopropyl fumarate and the dimethyl, methyl t-butyl, di-n-butyl, di-t-butyl and diethyl esters of maleic, acid and fumaric acid, or maleic anhydride. If appropriate, the (meth)acrylic acid ester copolymers can comprise 1.0 to 65% by weight, based on the total weight of the comonomer phase, of α-olefins, such as ethylene or propylene, and/or vinyl aromatics, such as styrene, and/or vinyl halides, such as vinyl chloride, and/or ethylenically unsaturated dicarboxylic acid esters or derivatives thereof, such as diisopropyl fumarate and the dimethyl, methyl butyl, dibutyl and diethyl esters of maleic acid and fumaric acid, or maleic anhydride.

In a preferred embodiment, the vinyl, ester copolymers and the (meth)acrylic acid ester copolymers also comprise 0.05 to 10.0% by weight, based on the total weight of the comonomer mixture, of auxiliary monomers from the group consisting of ethylenically unsaturated carboxylic acids, preferably acrylic acid or methacrylic acid; from the group consisting of ethylenically unsaturated carboxylic acid amides, preferably acrylamide; from the group consisting of ethylenically unsaturated sulfphonic acids or salts thereof, preferably vinylsulphonic acid; and/or from the group consisting of polyethylenically unsaturated comonomers, for example divinyl adipate, diallyl maleate, allyl methacrylate or triallyl cyanurate. Comonomers which have a crosslinking action are also suitable as auxiliary monomers, for example acrylamidoglycolic acid (AGA), methylacrylamidoglycolic acid methyl ester (MAGME), N-methylolacrylamide (NMAA), N-methylolmethacrylamide, allyl N-methylolcarbamate and alkyl ethers, such as the isobutoxy ether, or esters of N-methylolmethacrylamide or of allyl N-methylolcarbamate.

Statements corresponding to those for the (meth)acrylic acid ester copolymers apply to the copolymers of the esters of maleic or fumaric acid.

In a preferred embodiment, the dispersible powder composition comprises 8 to 60% by weight, preferably 10 to 35% by weight, of protective colloid, based on the total amount of water-insoluble polymer, some of the amount of protective colloid preferably being added to the finished, dispersion or the solution or mixture of the composition of polymer and further additives before spray drying, preferably in the form of an aqueous solution. Suitable protective colloids are, for example, polyvinyl alcohols and derivatives thereof; polysaccharides in water-soluble form, such as starches (amylose and amylopectin), cellulose, guar, tragacanthic acid, dextran, alginates and carboxymethyl, methyl, hydroxyethyl and hydroxypropyl derivatives thereof; proteins, such as casein, soya protein and gelatine; synthetic polymers, such as poly(meth)acrylic acid, poly(meth) acrylamide, polyvinylsulphonic acids and water-soluble copolymers thereof; melamine-formaldehydesulphonates, naphthaleneformaldehydesulphonates and styrene/maleic acid and vinyl ether/maleic acid copolymers.

Additives which are in solid, preferably pulverulent, form can also be added to the redispersible powder during or after drying, such as, in particular, antiblocking agents, such as Ca carbonate or Mg carbonate, talc, gypsum, silicic acid, silicates, aluminum oxide and pigments, in each case with particle sizes preferably in the range from 5 nm to 10 μm.

The silicon compounds which are redispersible in water can be prepared by drying emulsions and/or dispersions of organosilicon compounds which are insoluble in water and preferably boil at >160° C. The emulsification of organosilicon compounds which are solid at room temperature can be carried out either under the influence of heat or by prior dissolution in a suitable organic solvent or by mixing with one or more other (organo)silicon compound(s) which are preferably liquid at room temperature, in an aqueous solution of film-forming polymers, if appropriate in the presence of emulsifiers, antiblocking agents and other additives. Drying or microencapsulation can be carried out by spray drying, freeze drying or thin film drying, such as belt drying or roller drying.

Preferred organosilicon compounds which are redispersible in water are: silicic acid esters $Si(OR')_4$, organoorganoxysilanes $SiR_n(OR')_{4-n}$, where n=1 to 3, polysilanes of the general formula $R_3Si(SiR_2)_nSiR_3$, where n=0 to 500, preferably 0 to 8, di-, oligo- and polysiloxanes of units of the general formula $R_cH_dSi(OR')_e(OH)_fO_{(4-c-e-e-f)/2}$, where c=0 to 3, d=0 to 1, e=0 to 3, f=0 to 3 and the sum c+d+e+f is not more than 3.5 per unit, in which R' is identical or different alkyl radicals or alkoxyalkylene radicals having 1 to 4 C atoms, preferably methyl or ethyl, and R is identical or different and is branched or unbranched alkyl radicals having 1 to 22 C atoms, cycloalkyl radicals having 3 to 10 C atoms, alkylene radicals having 2 to 4 C atoms or aryl, aralkyl or alkylaryl radicals having 6 to 18 C atoms, where the radicals R mentioned can also be substituted by halogens, such as F or Cl, or by ether, thioether, ester, amide, nitrile, hydroxyl, amine, carboxyl, sulphonic acid, carboxylic acid anhydride and carbonyl groups, and where, in the case of the polysilanes, R can also have the meaning OR'.

Particularly preferred organosilicon compounds are: tetraethoxysilane, methyltripropoxysilane, methyltriethoxysilane, γ-chloropropyltriethoxysilane, β-nitriloethyltriethoxysilane, γ-mercaptopropyltriethoxy- and -trimethoxysilane, phenyltriethoxysilane, isooctyltriethoxysilane, dipropyldiethoxysilane, triphenylsilanol and condensation products, which are preferably liquid, thereof, if appropriate with other low-boiling and/or water-soluble silanes, such as methyltrimethoxysilane, γ-aminopropyltriethoxysilane or other silanes containing amino functions, silanes containing quaternary ammonium salt groups, silanes containing epoxide groups, and silanes containing carboxylic acid or carboxylic acid anhydride functional groups. The disilanes dimethyltetraalkoxydisilane, tetramethyldialkoxydisilane, trimethyltrialkoxydisilane or (co)condensates thereof which are generally obtainable from the corresponding chlorine compounds. Methylhydridopolysiloxanes blocked by trimethylsiloxy end groups, copolymers of dimethylsiloxane and methylhydridosiloxane units blocked by trimethylsiloxy end groups and dimethylpolysiloxanes which contain an Si-bonded hydroxyl group in each of the terminal units are also particularly preferred.

The preparation of the organosilicon compounds can be carried out by processes such as are described in Noll, Chemie und Technologie der Silicone [Chemistry and Technology of the Silicones], 2nd Edition 1968, Weinheim and in Houben-Weyl, Methoden der organischen Chemie [Methods of organic Chemistry], Volume E 20, page 1782 f 2219 f, Georg Thieme Verlag, Stuttgart, 1987.

If powders with poorer redispersing properties are to be added, for example in order to achieve a delayed development of the action, those which comprise at least, as an additional protective colloid, ammonium salts of copolymers of styrene and maleic and/or fumaric acid, of condensation products of sulphonated phenols or naphthalenes with formaldehyde, or of other film-forming polymers which are water-soluble because of the ammonium salt groups, are preferably used. Water-soluble proteins which keratinize under the preparation or use conditions are also suitable for this purpose.

The organosilicon compounds described and (organo) silicon compounds which are water-soluble and also boil at <150° C. can also be added to the building material mixture in a form applied to a carrier substance. In this case, they are applied to a preferably pulverulent carrier substance. The preparation of such compositions of organosilicon compounds applied to carrier substances is described in DE-A 19535833.

The particle size of the pulverulent, inorganic or organic carrier substances is preferably from 0.005 to 3000 μm, in particular up to 500 μm. Suitable carrier substances which have an adsorptive action are preferably finely divided solids having the largest possible BET surface area, preferably >5 $m^2/g$, particularly preferably >10 $m^2/g$.

Examples of carrier substances which have an adsorbtive action and/or include the liquids in their pores are precipitated chalk and other finely divided carbonates, such as magnesium carbonate and/or calcium carbonate, as well as magnesium hydrosilicates, finely divided titanium dioxide, aluminas, bleaching earths, activated aluminium oxide, vermiculites, such as bentonite, expanded perlite and phosphates, such as Na phosphate. Crosslinked and non-crosslinked organic materials are also suitable, such as, for example, polyvinyl alcohol powder; pulverulent cellulose (derivatives); pulverulent starch (derivatives); polyvinyl chloride powders; rubbers and thermosetting resins.

The mineral, hydraulically setting coating agent and binder compositions prepared according to the invention are suitable for use as cement mortars, plasters, building adhesives (for example the adhesives), filling or stopping compositions or plaster of Paris. For these purposes, the additives customary in these applications can also be added to the compositions, for example pigments, such as titanium oxide, fillers, such as talc, quartz (sand), calcium carbonate, aluminium silicates or fibre materials, thickeners, such as cellulose, dispersants, fungicides, preserving auxiliaries, defoamers, wetting agents or film formation auxiliaries.

The mineral coating agent and binder compositions prepared according to the invention which are not hydraulically setting are suitable for use as paints, primers, cement-free stopping compositions, coating agents for paper and textiles and as adhesives for wood, paper and plastic. For these purposes, the additives customary in these applications can also be added to the compositions, for example pigments, thickeners, such as cellulose, dispersants, fungicides, preserving auxiliaries, defoamers, wetting agents or film formation auxiliaries.

The procedure according to the invention offers the following advantages over the prior art: The material to be conditioned can be optimized, according to application technology requirements, with few products, in general two being sufficient (a redispersible organic polymer and a redispersible organosilicon compound), in the desired ratio of amounts according to the profile of requirements. In contrast to the prior art, with a fixed given organic polymer/ organosilicon ratio in the redispersible powder, this leads to considerable savings in costs both for the producer of these conditioning products and for the producer of the coating or building binder dry mixtures which are hydraulically setting or are not hydraulically setting: the need to store and process many different organic polymer/organosilicone dispersible powders with fixed given ratios is eliminated.

The reason for using the previously known dispersible powders with a fixed given organic polymer/organosilicone ratio was that with the very small amount usually used of organosilicone compound, it could not be expected that these small amounts would be able to be admixed homogeneously to coating or binder compositions. The prior art therefore took the path of spraying aqueous dispersions of high organic polymer content and low organosilicone content in order to distribute the organosilicone content homogeneously over the higher organic polymer content. It is surprising in the case of the procedure according to the invention that the relatively very small amounts of organosilicon compounds mixed in have just as good an effect, in spite of a distribution which is certainly not optimum, as when they are incorporated via the considerably larger amount of organic polymer/organosilicon dispersible powder.

The test results in Table 1 show that the compositions prepared according to the invention have the same hydrophobizing action, with the same amount of silane added, as products of the correspondingly hydrophobized redispersible polymer powders (Example 1 and Comparison Example 2). Comparison Example 1 shows the values which are obtained without addition of silane.

Compared with Comparison Example 2, Examples 2 and 3 show that the hydrophobizing action of dispersible powders which have already been hydrophobized can be improved by this process. These experiments also show that there is no significant difference in respect of mechanical strength and hydrophobizing action between incorporation of the hydrophobizing agent into the redispersible polymer powder, which is in this case already hydrophobized, and separate mixing of the entire hydrophobizing agent into the building material mixture.

Example 4 and Comparison Example 3 demonstrate corresponding results in the case where another type of resin is used.

EXAMPLES

Examples 1–4

Joint filler recipe:

| | |
|---|---|
| 300.0 parts | of Portland cement PZ 35 F |
| 40.0 parts | of aluminate cement (HAC-Fondu Lafarge) |
| 649.5 parts | of quartz sand (0.1–0.4 mm) |
| 0.5 parts | of Culminal C 8556 |
| 10.0 parts | of dispersible powder (see Table 1) |
| X parts | of isooctyltriethoxysilane powder (IOTES powder), microencapsulated with 14% of polyvinyl alcohol |
| 200 ml | of water per 1000 g of dry mixture |

Testing of the joint filler recipe

The flexural tensile strength and compressive strength of cement compositions prepared with these recipes were tested in accordance with DIN 1164. The uptake of water was determined in accordance with DIN 52617. The samples were stored for 14 days in a standard climate (23° C./50% relative atmospheric humidity). The processability was evaluated qualitatively.

The results of the testing are summarized in Table 1.

Example 5

Full thermal insulation recipe (building adhesive):

| | |
|---|---|
| 280.0 parts | of Dykerhoff white cement |
| 500.0 parts | of quartz sand (0.1–0.4 mm) |
| 190.0 parts | of Juraperle MHS |
| 1.5 parts | of Tylose BA 2741 |
| 20.0 parts | of dispersible powder (see Table 2) |
| X parts | of isooctyltriethoxysilane powder, microencapsulated with 14% of polyvinyl alcohol (IOTES powder) |
| 20.0 parts | of water |

Testing of the building adhesive recipe:

The tensile bond strength was determined at a peel-off rate of 250 N/s after storage in the dry state for 14 days. For the water drop test, 0.5 ml of water was applied with a pipette to the surface of the adhesive composition applied to Styropor, and the time taken for the drop to be absorbed was measured.

TABLE 1

| Example No. | 1 | 2 | Comparison Example 1 | Comparison Example 2 | 3 | 4 | Comparison Example 3 |
|---|---|---|---|---|---|---|---|
| Uptake of water (kg/m$^2$ · h$^{0.5}$) | 0.25 | 0.15 | 0.79 | 0.24 | 0.16 | 0.12 | 0.58 |
| Flexural tensile strength (N/mm$^2$) | 4.7 | 4.5 | 4.9 | 4.8 | 4.7 | 5.5 | 5.6 |
| Compressive strength (N/mm$^2$) | 16.8 | 16.2 | 17.3 | 17.0 | 16.7 | 18.2 | 18.4 |
| Processability | Somewhat tacky | Somewhat tacky | Somewhat tacky | Somewhat tacky | Somewhat tacky | Very good | Very good |
| Dispersible powder type | RE545Z** | RE545Z** | RE545Z** | * | * | LL512*** | LL512*** |
| Parts of IOTES powder | 0.29 | 0.44 | — | — | 0.15 | 0.44 | — |

*As RE 545 Z with 0.25%, based on the polymer, of co-sprayed isooctyltriethoxysilane
**Product of Wacker-Chemie GmbH, redispersible vinyl acetate/ethylene powder
***Product of Wacker-Chemie GmbH, redispersible styrene/butyl acrylate powder

TABLE 2

(Testing of the adhesive recipe on polystyrene sheets)

| Example | 5 | 6 | Comparison Example 4 |
|---|---|---|---|
| Tensile bond strength (N/mm$^2$) | 0.1 100% Styropor torn out | 0.1 100% Styropor torn out | 0.1 70% Styropor torn out |
| Water drop test | 140 minutes | 360 minutes | 5 minutes |
| Dispersible powder type | RE 545 Z | RE 545 Z | RE 545 Z |
| Parts of IOTES powder | 0.29 | 0.44 | |

The results show that the hydrophobizing properties of this building adhesive can be varied within wide limits with the process claimed.

Example 7

Rolling plaster recipe:

| | |
|---|---|
| 452.0 parts | of Inducarb 500 (CaCO$_3$, 0.03–0.5 mm) |
| 200.0 parts | of Inducarb 0000 (CaCO$_3$, 0.4–0.9 mm) |
| 150.0 parts | of white cement PZ 45 F |
| 80.0 parts | of hydrated lime 2741 |
| 40.0 parts | of Kronos 2056 (TiO$_2$ pigment) |
| 15.0 parts | of Arbocel BC 1000 (cellulose ether) |
| 2.0 parts | of Culminal MC 3000 PR (cellulose ether) |
| 1.0 part | of Amylotex 8100 (starch ether) |
| 60.0 parts | of dispersible powder |
| X parts | of isooctyltriethoxysilane powder, partly condensed, microencapsulated with 14% of polyvinyl alcohol (IOTES powder) |
| Water requirement per 1000 g of dry mixture: about 350 ml | |

Testing of the roller powder recipe:

The tensile bond strength of plasters prepared with these recipes was tested in accordance with DIN 1164.

With method A, the measurement was carried out after storage in the dry state for 28 days at 23° C./50% relative atmospheric humidity. With method B, the measurement was carried out after storage in the dry state for 7 days at 23° C./50% relative atmospheric humidity and storage for a further 21 days under water at 23° C. The flexural tensile strength and compressive strength, were determined in accordance with the abovementioned standard after storage in the dry state for 28 days at 23° C/50% relative atmospheric humidity.

The water uptake coefficient was determined in accordance with DIN 52617 after storage of the recipe in the dry state for 14 days at 23° C./50% relative atmospheric humidity.

The results of the testing are summarized in Table 3.

TABLE 3

| Example | 7 | 8 | 9 | 10 | Comparison Example 5 | Comparison Example 6 |
|---|---|---|---|---|---|---|
| Tensile bond strength | | | | | | |
| Method A (N/mm$^2$) | 0.84 | 0.92 | 0.79 | 0.81 | 0.80 | 0.68 |
| Method B (N/mm$^2$) | 0.91 | 0.87 | 0.69 | 0.72 | 0.81 | 0.71 |
| Compressive strength (N/mm$^2$) | 3.42 | 3.05 | 2.77 | 3.21 | 3.18 | 2.59 |
| Flexural tensile strength (N/mm$^2$) | 2.53 | 2.39 | 2.34 | 2.60 | 2.57 | 2.28 |
| Water uptake (kg/m$^2$ · h$^{0.5}$) | 0.152 | 0.071 | 0.057 | 0.091 | 0.070 | 0.362 |
| Dispersible powder type | RE545Z | RE545Z | RE545Z | RE545Z | * | RE545Z |
| Parts of IOTES powder | 0.29 | 0.44 | 0.6 | — | — | — |
| Parts of IOTES/ Trasil powder (1:2)** | — | — | — | 0.44 | — | — |

*= As RE 545 Z with 0.25%, based on the polymer, of co-sprayed isooctyltriethoxysilane
**Trasil is a partly condensed methyltrimethoxysilane (product of Wacker-Chemie GmbH)

Table 3 shows that the same hydrophobizing action is achieved with the process described as with the known processes, but with the advantage that the hydrophobization can be varied according to the requirements of the user.

Examples 11–12

Alabaster gypsum mortar was modified with in each case 2% of dispersible powder, 1% of hydrated lime and optionally X % of microencapsulated siloxane powder (81% strength) (water/gypsum: 0.65)

The tests were carried out on 1×4×16 cm$^3$ prisims after the following storage:

| | |
|---|---|
| 1 day | in the shuttering |
| 5 days | standard climate |
| 5 days | 40° C. |
| 1 day | standard climate |

After this storage the samples had reached constant weight and were hydrated completely to the dihydrate.

The capillary uptake of water can be seen from Table 4.

TABLE 4

| Example | 11 | 12 | Comparison Example 7 |
|---|---|---|---|
| Dispersion powder type | RE524Z** | RE524Z** | RE524Z** |
| H-siloxane powder (81% strength)*** | 0.074* | — | — |
| Trasil powder**** | — | 0.6* | — |
| Capillary uptake of water, rise in cm after | | | |
| 1 hour | 0.7 | 0.5 | 5.3 |

TABLE 4-continued

| Example | 11 | 12 | Comparison Example 7 |
|---|---|---|---|
| 3 hours | 1.6 | 1.2 | 10.6 |
| 24 hours | 7.1 | 5.6 | saturated |

*Based on the total mixture
**Product of Wacker-Chemie GmbH, VAc/E copolymer powder stabilized with polyvinyl alcohol
***H-siloxane powder microencapsulated with 19% of polyvinyl alcohol
****Product of Wacker-Chemie GmbH, partly condensed methyltriethoxysilane, microencapsulated with 19% of polyvinyl alcohol

What is claimed is:

1. Process for the polymer modification of mineral coating agent and binder compositions, which are hydraulically setting or are not hydraulically setting, which comprises adding to the coating agent or composition one or more organic polymer powders which are redispersible in water and one or more organosilicon powders which are redispersible in water to the dry coating or binder composition.

2. Process according to claim 1, wherein 0.1 to 20% by weight of one or more redispersible organic polymer powders and 0.001 to 5.0% by weight of one or more organosilicon powders which are redispersible in water are added to the dry coating agent or binder composition, in each case based on the dry weight of the coating agent or binder compositions.

3. Process according to claim 1, wherein the organic polymer powder and the organosilicon powder are added separately.

4. Process according to claim 1, wherein the organic polymer powder and the organosilicon powder are added as a ready-made mixture of organic polymer and organosilicon powder.

5. A mineral coating agent which has been modified by the process of claim 1.

6. A binding composition which has been modified by the process of claim 1.

* * * * *